United States Patent
Eglin

(10) Patent No.: US 9,623,965 B2
(45) Date of Patent: Apr. 18, 2017

(54) ROTORCRAFT HAVING A STABILIZER DEVICE

(71) Applicant: AIRBUS HELICOPTERS, Marignane (FR)

(72) Inventor: Paul Eglin, Roquefort la Bedoule (FR)

(73) Assignee: AIRBUS HELICOPTERS, Marignane (FR)

( * ) Notice: Subject to any disclaimer, the term of this patent is extended or adjusted under 35 U.S.C. 154(b) by 16 days.

(21) Appl. No.: 14/870,317

(22) Filed: Sep. 30, 2015

(65) Prior Publication Data

US 2016/0090176 A1 Mar. 31, 2016

(30) Foreign Application Priority Data

Sep. 30, 2014 (FR) ..................... 14 02194

(51) Int. Cl.
| | | |
|---|---|---|
| B64C 27/00 | (2006.01) | |
| B64C 27/82 | (2006.01) | |
| B64C 27/467 | (2006.01) | |
| B64C 27/08 | (2006.01) | |
| B64C 27/37 | (2006.01) | |
| B64C 5/18 | (2006.01) | |

(52) U.S. Cl.
CPC .............. *B64C 27/467* (2013.01); *B64C 5/18* (2013.01); *B64C 27/08* (2013.01); *B64C 27/37* (2013.01); *B64C 27/82* (2013.01); *B64C 2027/8272* (2013.01); *B64C 2027/8281* (2013.01)

(58) Field of Classification Search
CPC ......... B64C 5/18; B64C 27/467; B64C 27/82; B64C 2027/82; B64C 2027/8272; B64C 2027/8281; B64C 3/54
See application file for complete search history.

(56) References Cited

U.S. PATENT DOCUMENTS

| | | |
|---|---|---|
| 4,614,320 A | 9/1986 | Rutan |
| 5,388,785 A | 2/1995 | Rollet et al. |
| 6,974,105 B2 | 12/2005 | Pham |
| 7,451,949 B2 | 11/2008 | Eglin |
| 8,070,089 B2 | 12/2011 | Ferrier |

(Continued)

FOREIGN PATENT DOCUMENTS

| | | |
|---|---|---|
| EP | 2105378 | 9/2009 |
| EP | 2371707 A2 | 10/2011 |

(Continued)

OTHER PUBLICATIONS

French Search Report for French Application No. FR 1402194, Completed by the French Patent Office on May 21, 2015, 7 Pages.

(Continued)

*Primary Examiner* — Philip J Bonzell

(74) *Attorney, Agent, or Firm* — Brooks Kushman P.C.

(57) ABSTRACT

A rotorcraft having at least one stabilizer device of the tail plane and/or of the tail fin type. At least one stabilizer device is a variable wing area stabilizer device comprising an airfoil member provided with a stationary airfoil surface and a movable airfoil surface. A control system is connected to a mover system for moving the movable airfoil surface in translation between a refracted position for occupying when the rotorcraft has a forward speed less than a first speed threshold, and an extended position for occupying when the rotorcraft has a forward air speed greater than a second speed threshold greater than the first speed threshold.

18 Claims, 3 Drawing Sheets

(56) References Cited

U.S. PATENT DOCUMENTS

| | | |
|---|---|---|
| 8,196,863 B2 | 6/2012 | Couffignal et al. |
| 8,985,500 B2 | 3/2015 | Borie et al. |
| 2009/0256025 A1 | 10/2009 | Verde Preckler et al. |
| 2013/0313355 A1 | 11/2013 | Gatti et al. |
| 2014/0077026 A1 | 3/2014 | Beroul |

FOREIGN PATENT DOCUMENTS

| | | |
|---|---|---|
| EP | 2409917 | 1/2012 |
| EP | 2708466 | 3/2014 |
| EP | 2371707 B1 | 4/2014 |
| FR | 2689854 | 10/1993 |
| FR | 2911113 | 7/2008 |

OTHER PUBLICATIONS

English Translation to Korean Office Action, Office Action Dated Dec. 16, 2016, English translation 4 Pages.

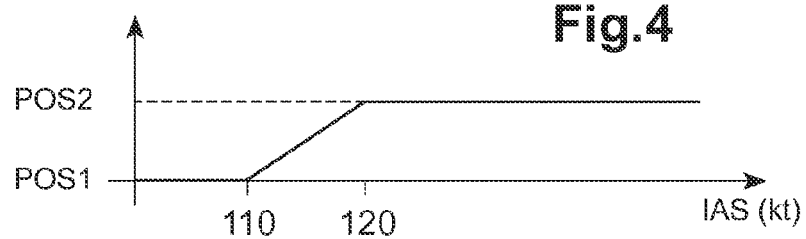
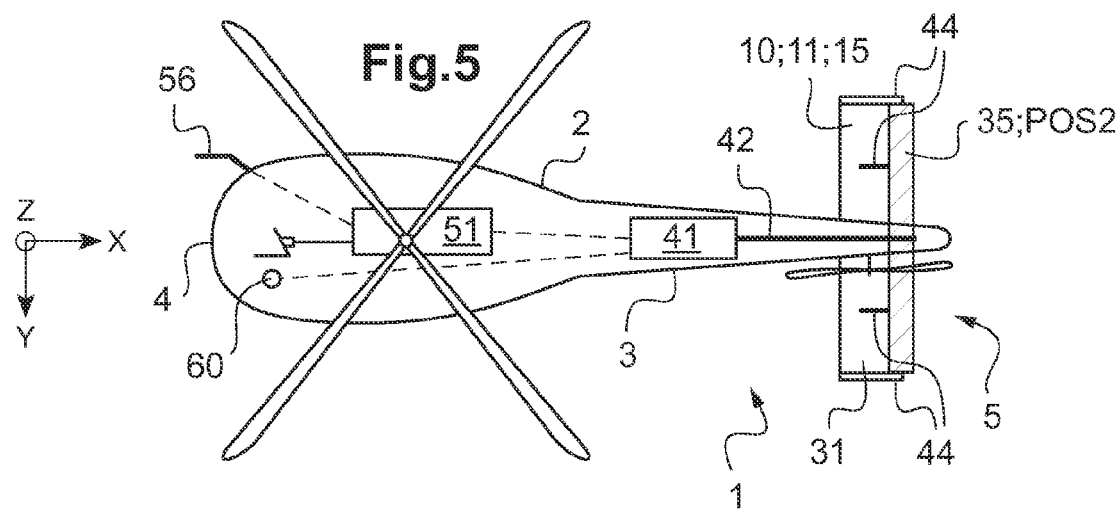
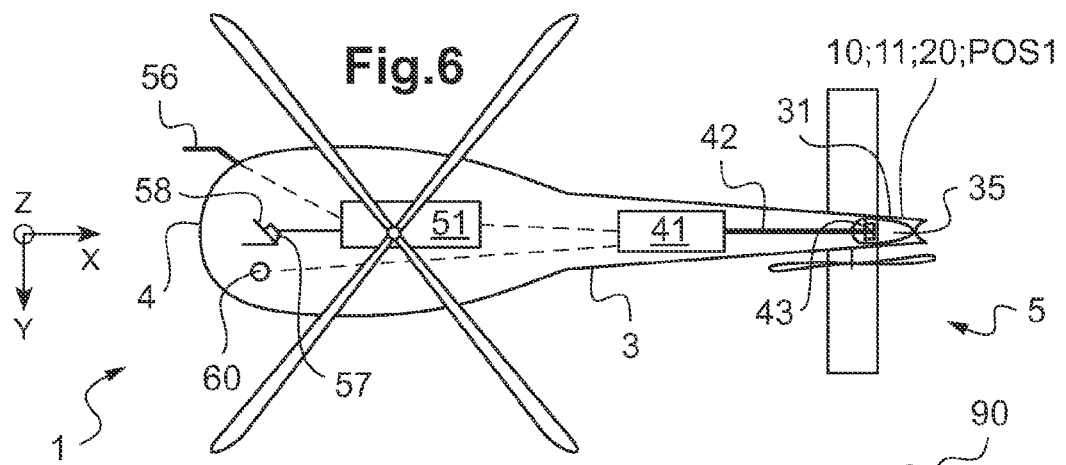
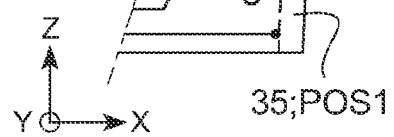

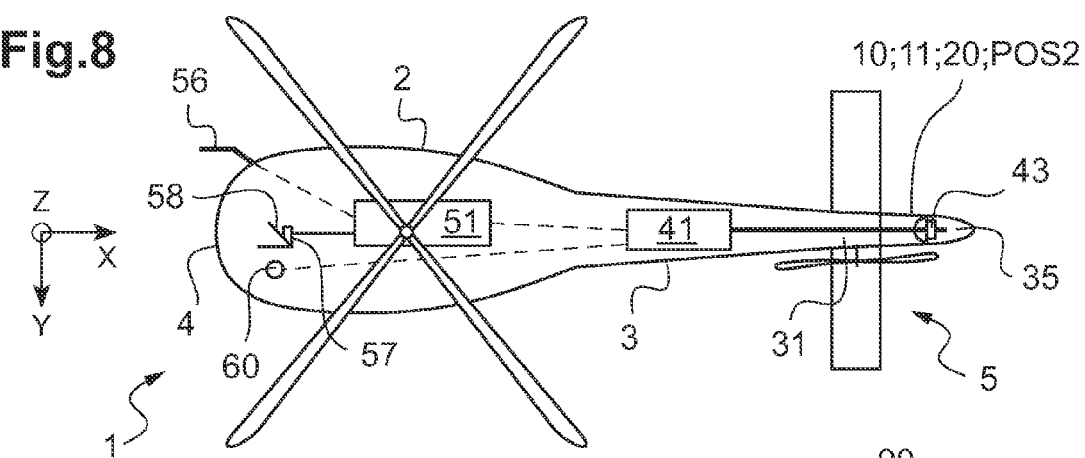
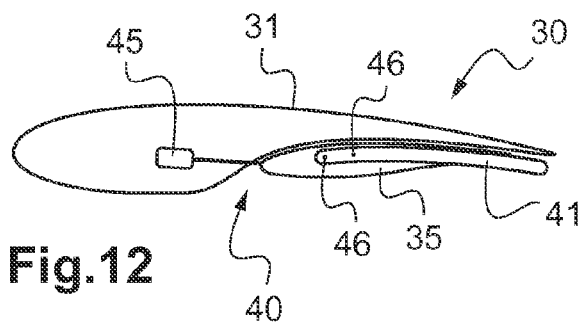
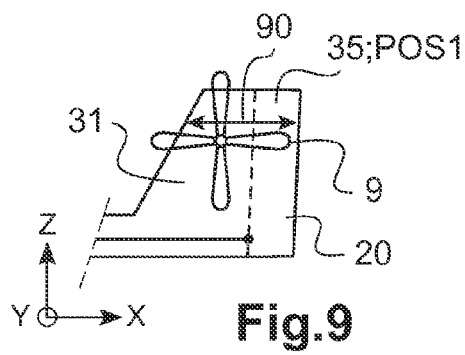
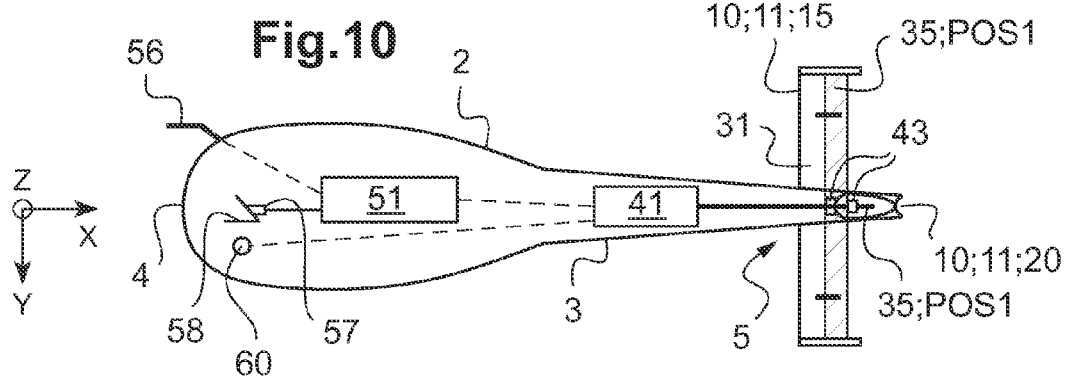
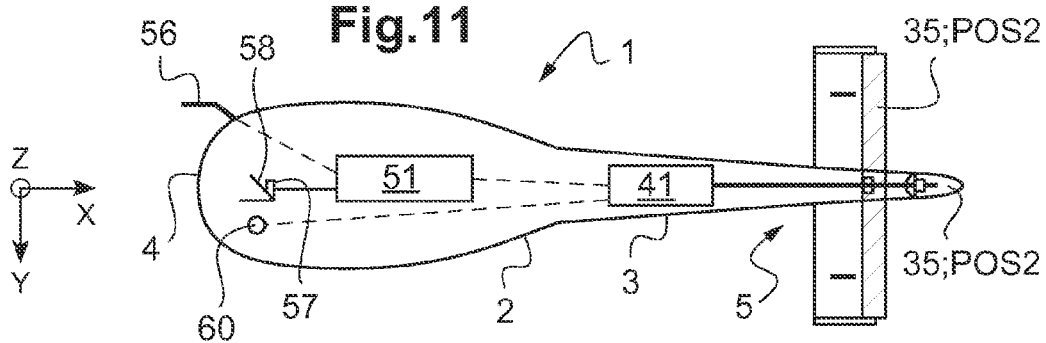

1

ROTORCRAFT HAVING A STABILIZER DEVICE

CROSS REFERENCE TO RELATED APPLICATION

This application claims priority to French patent application No. FR 14 02194 filed on Sep. 30, 2014, the disclosure of which is incorporated in its entirety by reference herein.

BACKGROUND OF THE INVENTION (1) Field of the Invention

The present invention relates to a rotorcraft having a stabilizer device. The rotorcraft may in particular be a helicopter.

The invention thus lies in the narrow technical field of rotorcraft stabilizer devices, which devices are subjected to phenomena that do not appear on airplanes.

(2) Description of Related Art

Conventionally, an aircraft comprises an airframe extending longitudinally from a front end to a rear end and on either side of an anteroposterior plane of symmetry.

Furthermore, an aircraft sometimes includes stabilizer devices at its rear end for stabilizing certain movements of the aircraft.

The stabilizer devices include a stabilizer surface for stabilizing yaw movement of the aircraft.

Such a yaw movement stabilizer surface is generally referred to as a "tail fin".

Furthermore, such stabilizer devices include stabilizer means for stabilizing pitching movements of the aircraft. Means for stabilizing pitching movements conventionally comprise at least one stabilizer surface presenting an angle of absolute value lying in the range 0° and plus or minus 90° relative to the anteroposterior plane of symmetry of the aircraft.

Such means for stabilizing pitching movements are sometimes referred to as a "horizontal tail plane", or more simply "tail plane" below. The term "tail plane" is used more particularly when the stabilizer means are not necessarily horizontal. The term "pitching stabilizer means" is also used.

The pitching stabilizer means may comprise at least one airfoil surface passing right through the rear end of the aircraft in a transverse direction, or indeed it may include a non-through airfoil surface extending transversely from said rear end.

Such stabilizer devices perform an essential stabilizing role during forward flight of an airplane, but they can be penalizing for a rotorcraft.

An airplane usually has at least one wing carrying the airframe, and also a tail plane and a tail fin at the rear end of the airframe.

In contrast, the rotorcraft has at least one rotor providing lift and possibly also propulsion, which rotor is known as the "main rotor" for convenience. The airframe of a rotorcraft then extends for example in a vertical direction from a bottom portion having landing gear to a top portion carrying such a main rotor.

A helicopter type rotorcraft is thus provided with at least one main rotor providing the aircraft with at least some of its lift and propulsion.

Furthermore, a helicopter having a single main rotor is sometimes fitted with a tail rotor carried by a tail at its rear end. The tail rotor serves in particular to oppose the yaw torque exerted on the fuselage by the main rotor. Furthermore, the tail rotor serves to control movements in yaw of the helicopter.

The tail rotor of a helicopter is then either arranged within a tail fin in the context of a ducted tail rotor of the Fenestron® type, or else it is carried by the tail fin in the context of an unducted tail rotor.

As a result, a rotorcraft may have at least one main rotor and a tail rotor that interacts in harmful manner on stabilizer devices.

A rotary wing aircraft, and in particular a helicopter, can also perform hovering flight or flight at very low speed, namely at speeds of less than 70 knots (kt) for example.

During these stages of hovering or low-speed flight, such stabilizer devices can be found to be harmful.

Under such circumstances, when the tail fin carries the tail rotor, the air stream generated by the tail rotor can impact against the tail fin during the stages of hovering or low speed flight. The tail fin then blocks that air stream in part, thereby reducing the yaw moment exerted by the tail rotor on the airframe of the aircraft.

Under such circumstances, the power necessary for operating the tail rotor needs to be increased in order to compensate for the loss of efficiency caused by the tail fin.

That phenomenon which is sometimes referred to as the "tail fin blocking phenomenon", does not happen on an airplane since an airplane does not have a tail rotor.

In order to limit this need for increased power, the trailing edge of the tail fin can be truncated. Nevertheless, the tail fin then becomes less effective in forward flight because of the reduction in its wing area.

Likewise, pitching stabilizer means are effective during a stage of cruising flight, with effectiveness increasing with increasing forward speed of the helicopter. Furthermore, the effectiveness of pitching stabilizer means is maximized by maximizing its wing area.

Nevertheless, the flow of air passing through the main rotor of a conventional helicopter in flight is deflected downwards, and in certain flight situations it comes to impact against the pitching stabilizer means, in particular when moving in translation at low speed or during hovering flight. This flow of air then exerts forces on the pitching stabilizer means that the pilot needs to compensate by operating flight controls.

Nevertheless, when flying conditions vary, the deflection of the air flow is also modified. Consequently, the forces exerted on the pitching stabilizer means by the air flow are also modified.

This phenomenon is referred to by the person skilled in the art as the "attitude hump", and it does not occur on an airplane.

During a stage of transition between hovering flight and cruising flight, e.g. in the range 40 kt to 70 kt, the forces exerted by the air flow passing through the main rotor tend mainly to cause the tail plane to lose lift and impart a nose-up attitude to the helicopter by striking the pitching stabilizer means. This stage of flight is commonly referred to as the "transition stage" insofar as it is generally situated at low speed between a stage of hovering flight and a stage of cruising flight.

In order to balance the helicopter, the pilot must then use the stick for controlling the cyclic pitch of the blades of the main rotor in order to reduce the nose-up attitude of the helicopter.

The loss of lift generated by the pitching stabilizer means under such conditions is harmful for the performance of the aircraft. Furthermore, the nose-up movement of the aircraft is harmful for a pilot's visibility, particularly during a stage of approaching a landing area.

Furthermore, optimizing the pitching stabilizer means by maximizing its wing area accentuates the attitude hump.

Under such circumstances, using pitch stabilizer means of large wing area on a helicopter appears to be impossible without leading to an increase in the attitude hump phenomenon.

In this context, a rotorcraft is subjected to difficulties that are unknown to airplane manufacturers.

The design of stabilizer devices for a rotorcraft, and in particular for a helicopter, thus involves a compromise between the stage of flight when moving fast in translation and stages of flight when hovering or at low speeds.

To remedy the problem, stabilizer devices have a stationary airfoil surface and an airfoil surface that is movable in rotation relative to the stationary airfoil surface. The position of the movable surface relative to the stabilizer surface can then be controlled using at least one actuator.

The function of the movable airfoil surface is to modify the camber of the stabilizer device in order to modify its lift.

The actuator can be controlled by means of flight controls and/or by a computer.

Although advantageous, the main difficulty with that solution lies in the critical nature of the function and of the control forces to which the actuator is subjected.

A tail plane flap may be turned through an angle of 70° in hovering flight relative to a forward flight position. This angle may be incompatible with the operating range of an electric actuator because of the high levels of force to be delivered.

Under such circumstances, the device may comprise an electric actuator backed up by a hydraulic actuator, thereby making its architecture more complex.

Furthermore, a tail plane with an active rotary flap requires an actuator with a large bandwidth that is servo-controlled by a calculation closed loop. The problem posed by that type of architecture lies in finding an actuator that operates at high frequency.

Document FR 2 689 854 describes a helicopter tail fin. The tail fin has an airfoil surface. The tail fin then has a flap that is movable in rotation by being hinged to the trailing edge of the airfoil surface. The angle through which the flap is turned relative to a neutral position is a function of the collective pitch angle of the blades of a rotor of the aircraft and a function of the forward speed of the aircraft.

Furthermore, documents are known relating to a technical field that is remote from that of the invention, namely the technical field of airplanes. These documents are mentioned solely by way of illustration.

Document EP 2 371 707 B1 relates, according to its paragraph 13, to reducing the area of the tail fin of an airplane without reducing the ability of a flap of the tail fin to move in rotation in the presence of a large yaw moment, i.e. in the event of an engine failure, unbalance resulting from transporting external loads, gusts of wind, or flooding of a runway.

To this end, Document EP 2 371 707 A2 describes a tail fin having an airfoil surface. The tail fin then has a telescopic flap that is movable in rotation by being hinged to the trailing edge of the airfoil surface.

The tail fin blocking and attitude hump phenomena are thus not mentioned in that document.

Likewise, Document FR 2 911 113 describes an airplane tail plane.

That tail plane has a rotary flap hinged to a slider that moves in translation relative to a stationary surface. The flap slides in particular relative to the stationary surface in order to maximize the area of the tail fin during takeoff and landing, i.e. at low speed, and in order to minimize the area of the tail plane in cruising flight, i.e. at high speed.

That Document FR 2 911 113 shows a horizontal tail plane in a deployed position during stages of takeoff and landing and in a retracted position during cruising flight.

Those effects appear to be harmful to the tail fin blocking and attitude hump phenomena that are encountered in a rotorcraft.

Document US 2013/313355 describes pitching stabilizer means having at least one slot passing through the thickness of the pitching stabilizer means. At least one deflector separates two compartments in said slot.

Documents EP 2 409 917, EP 2 708 466, and EP 2 105 378 are also known.

BRIEF SUMMARY OF THE INVENTION

An object of the present invention is thus to provide a rotorcraft tending to reduce the tail fin blocking and/or attitude hump phenomena.

According to the invention, a rotorcraft has an airframe extending longitudinally from a nose to a rear zone. The rotorcraft comprises at least one main lift rotor and at least one tail rotor for controlling yaw movement and arranged in the rear zone, the rotorcraft including at least one stabilizer device arranged in the rear zone, each stabilizer device being selected from a list comprising a tail plane for stabilizing the rotorcraft in pitching and a tail fin for stabilizing the rotorcraft in yaw.

Furthermore, at least one of the stabilizer devices is referred to a "variable wing area stabilizer device". Each variable wing area stabilizer device comprises:

an airfoil member having a "stationary airfoil surface" that is stationary relative to said airframe, the airfoil member having a "movable airfoil surface" that is movable at least in translation relative to said stationary airfoil surface;

a mover system for moving said movable airfoil surface at least in translation relative to said stationary airfoil surface from a refracted position in which a reference chord of said airfoil member is at a minimum, to an extended position in which the reference chord of said airfoil member is at a maximum; and a control system connected to the mover system to position said movable airfoil surface in the refracted position when the rotorcraft has a forward speed less than a first speed threshold, and in an extended position when the rotorcraft has a forward speed greater than a second speed threshold greater than the first speed threshold.

For example, the movable airfoil surface is arranged between the leading edge and the trailing edge of the stationary airfoil surface in the retracted position.

In contrast, the movable airfoil surface projects transversely from the trailing edge of the stationary airfoil surface when outside the retracted position.

The term "reference chord" of an element designates the reference chord of that element situated at a given distance from the root of that element. For example, the reference chord of an element represents the chord at one end of the element, and in particular at its free end.

Consequently, the airfoil member has a first wing area and a reference chord having a first value when the movable airfoil surface is in the retracted position.

The airfoil member also has a second wing area and a reference chord having a second value when the movable airfoil surface is in the extended position. Under such circumstances, the first wing area and the first value are respectively less than the second wing area and the second value.

The invention thus proposes a tail plane and/or a tail fin of variable chord. A reference chord can vary by a very considerable amount. For rotorcraft, the movable airfoil surface may have a reference chord lying in the range one-fourth to one-half of the reference chord of the stationary airfoil surface.

Under such circumstances, the airfoil member is retracted at low speed so that the airfoil member presents a minimum area to the wash from a rotor. For example, the first speed threshold may be set at 40 kt.

Consequently, a variable wing area stabilizer device used as a tail plane can minimize the attitude hump phenomenon. In addition, a variable wing area stabilizer device used as a tail fin can minimize the tail fin blocking phenomenon in the context of a non-ducted tail rotor.

Above the first speed threshold, the movable airfoil surface moves in translation so as to increase the reference chord of the airfoil member in order to maximize the aerodynamic effect of the airfoil member.

When the forward speed reaches a second speed threshold, e.g. about 70 kt, the movable airfoil surface is in the extended position.

During a transition stage, when the forward speed lies between the first threshold and the second threshold, the movable airfoil surface is thus in an intermediate position between the refracted position and the extended position. For example, an affine function provides the intermediate position as a function of the forward speed.

Traditional prior art flaps operate for the most part in rotation in order to modify the camber of an airfoil surface.

The invention goes against those prejudices by moving the movable airfoil surface in translation.

In addition, the invention goes against the remote teaching that applies to airplanes. On an airplane, a manufacturer seeks to increase airfoil surface areas at low speed. Conversely, the invention seeks to reduce the wing area of an airfoil member at low speed.

Because of the specific features of a rotorcraft, the transition from the retracted position to the extended position, and vice versa, is not necessarily rapid.

Consequently, the mover system may have an actuator that is relatively slow, and possibly controlled using open loop regulation.

For example, in order to obtain an airfoil member having a reference chord that goes from 600 millimeters (mm) to 800 mm (+33% of chord) between 40 kt and 70 kt, an actuator capable of extending at a speed of about 3 millimeters per second (mm/s) to 12 mm/s may be found to be sufficient.

In addition, an actuator controlling a movement in translation presents the advantage of being relatively insensitive to control forces.

Furthermore, the invention is not critical in terms of safety.

If the movable airfoil surface should become jammed in the retracted position, the airfoil member continues to be effective, possibly being associated with a speed refuge range.

Conversely, if the movable airfoil surface jams in the extended position, low speed maneuvers are penalized, but they are not impossible to perform.

The rotorcraft may also include one or more of the following characteristics.

For example, when at least two stabilizer devices are "variable wing area stabilizer devices", the variable wing area stabilizer devices may have a control system in common.

This provision seeks to minimize the weight of the rotorcraft.

Likewise, when at least two stabilizer devices are "variable wing area stabilizer devices", the variable wing area stabilizer devices may have a mover system in common.

Furthermore, said mover system may be a wormscrew system provided with a motor, a wormscrew, and at least one nut engaged on the wormscrew.

A wormscrew actuator is relatively simple to use and very insensitive to the problem of control force.

The motor may be an electric motor.

Consequently, the wormscrew may be driven in rotation by the motor, for example, with the nut being fastened to a movable airfoil surface so as to be prevented from rotating relative to said movable airfoil surface.

In a variant, the mover system comprises a jack.

Independently of the variant, when the airframe has a tail boom carrying the variable wing area stabilizer device, the mover system may for example be arranged at least in part in said tail boom.

Thus, a wormscrew system or a jack can be housed inside the tail boom in order to avoid degrading the aerodynamic configuration of the rotorcraft.

Furthermore, said control system may include a computer, the computer being connected to a system for measuring the forward speed of the rotorcraft and to the mover system.

The computer may include at least one relationship for determining the appropriate position of the movable airfoil surface.

Such a computer may comprise a logic circuit or a processor executing instructions that are stored in a memory, for example.

The computer can then control the mover system by applying open-loop regulation thereto, based on the measured forward speed.

The computer can then apply a main regulation relationship relying on the measured forward speed of the aircraft.

For this purpose, the system for measuring the forward air speed may comprise an air speed measurement device enabling an indicated air speed (IAS) to be measured.

Such an air speed measurement device may be an air data computer measurement system.

In a variant, or in addition, the system for measuring forward speed comprises a measurement sensor for measuring a position of at least one flight control of said rotorcraft. In particular, the measurement sensor determines the position of a control for controlling the cyclic pitch of the blades of the main rotor.

For example, the measurement system makes use of the measurement sensor in the event of the air speed measurement system malfunctioning.

Furthermore, the computer may include a relationship for degrading control of the mover system so as to position the movable airfoil surface in the extended position in the event of the system for measuring forward air speed malfunctioning.

For safety purposes, in the event of the forward speed measurement system malfunctioning, the movable airfoil surface is placed in its extended position.

The rotorcraft may then have a conventional monitoring system that determines whether the forward speed measurement system is operated correctly. The monitoring system may be connected to the computer or it may be incorporated in the computer.

In addition, the control system may include manual control means operable by a pilot, the manual control means being connected to the mover system.

Thus, the invention may have one or more degraded modes for the piloting relationship in the event of the forward speed measurement being invalid.

The movable airfoil surface may be controlled manually, may be deployed in full, or may be controlled as a function of a speed estimated on the basis of the position of at least one flight control.

Optionally, a pilot may use a selector to select which degraded mode is to be applied.

Furthermore, said stationary airfoil surface optionally includes a housing opening out to a trailing edge of said stationary airfoil surface, said movable airfoil surface being housed at least in part in said housing when in the retracted position.

The term "housing" is used to designate a space that is defined at least in part by the stationary airfoil surface. The housing may be inscribed between the pressure side and the suction side of the stationary airfoil surface, or it may be defined solely by the pressure side or by the suction side.

The presence of the housing can tend to reduce the reference chord of the airfoil member when the movable airfoil surface is in the retracted position.

With the movable airfoil surface housed at least in part in said housing in the retracted position, the reference chord of the airfoil member is advantageously equal to the reference chord of the stationary airfoil surface when said movable airfoil surface is in the retracted position.

The wing area of the airfoil member is then minimized.

In order to maximize this wing area, the leading edge of the movable airfoil surface may in contrast be arranged against the trailing edge of the stationary airfoil surface when said movable airfoil surface is in the extended position. A narrow gap may optionally separate the leading edge from the trailing edge.

In addition, the movable airfoil surface, when in the extended position, lies in continuity with the stationary airfoil surface in the forward direction of the rotorcraft.

For example, when said rotorcraft has a forward speed less than the first speed threshold, an air stream coming from a rotor impacts against a face of said stationary airfoil surface, and said housing is masked by said face facing said air stream.

Furthermore, the airfoil surface may be movable in rotation and in translation. The rotary movement makes it possible to avoid the movable airfoil surface jamming against the stationary airfoil surface and/or it may enable the movable airfoil surface to be positioned so as to extend the stationary airfoil surface.

In another alternative, the movable airfoil surface is movable only in translation relative to the stationary airfoil surface, the mover system moving the movable airfoil surface in translation only relative to said stationary airfoil surface from a retracted position in which a reference chord of the airfoil member is at a minimum to an extended position in which the reference chord of the airfoil member is at a maximum.

BRIEF DESCRIPTION OF THE SEVERAL VIEWS OF THE DRAWINGS

The invention and its advantages appear in greater detail from the context of the following description of examples given by way of illustration and with reference to the accompanying figures, in which:

FIG. 4 is a diagram explaining the threshold beyond which the movable airfoil surface extends;

FIG. 5 is a diagrammatic plan view of a rotorcraft having a tail plane with a movable airfoil surface in the extended position;

FIG. 6 is a diagrammatic plan view of a rotorcraft having a tail fin including a movable airfoil surface in a retracted position;

FIG. 7 is a diagrammatic side view of a rotorcraft having a tail fin including a movable airfoil surface in the retracted position;

FIG. 8 is a diagrammatic plan view of a rotorcraft having a tail fin including a movable airfoil surface in an extended position;

FIG. 9 is a diagrammatic side view of a rotorcraft having a tail fin including a movable airfoil surface in the extended position;

FIG. 10 is a diagrammatic plan view of a rotorcraft having a tail fin and a tail plane, each including a movable airfoil surface in a retracted position;

FIG. 11 is a diagrammatic plan view of a rotorcraft having a tail fin and a tail plane, each including a movable airfoil surface in an extended position; and FIG. 12 is a diagrammatic view of an airfoil member having a movable airfoil surface that is movable in rotation and in translation.

DETAILED DESCRIPTION OF THE INVENTION

Elements present in more than one of the figures are given the same references in each of them.

It should be observed that three mutually orthogonal directions X, Y, and Z are shown in some of the figures.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "in elevation" relates to any direction parallel to the third direction Z.

Figure 1:
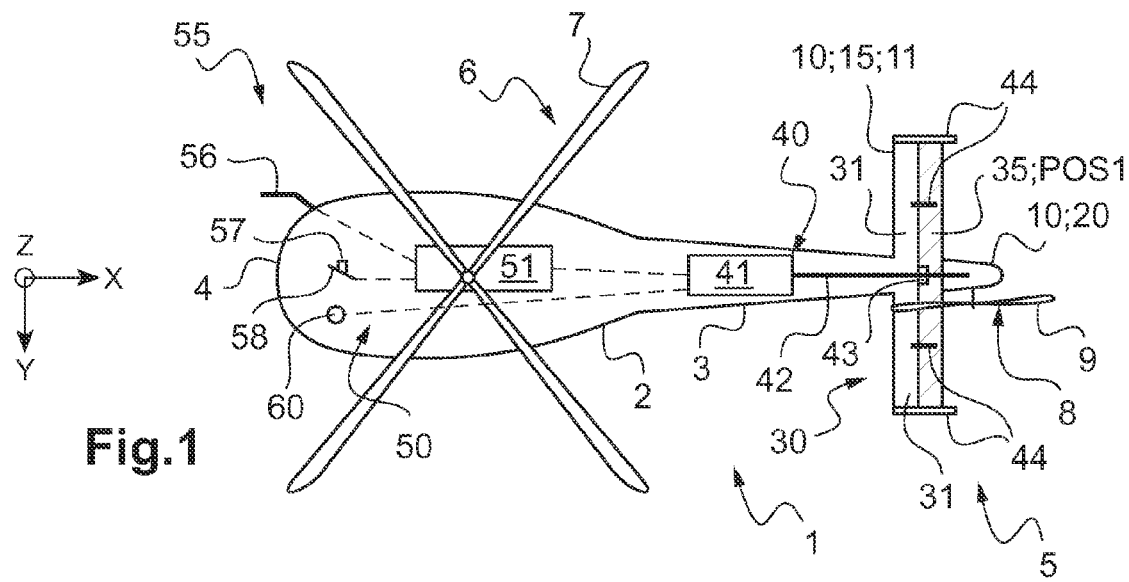
FIG. 1 is a diagrammatic plan view of a rotorcraft having a tail plane with a movable airfoil surface in a retracted position.

FIG. 1 shows a rotorcraft 1 of the invention.

Whatever the embodiment, the rotorcraft comprises an airframe 2. The airframe 2 extends longitudinally from a nose 4 to a rear zone 5. The rear zone 5 is carried by a tail boom 3 of the airframe. Such a rear zone 5 is commonly referred to as a "tail" by the person skilled in the art.

The rotorcraft 1 has at least one main rotor 6 for providing lift. The main rotor 6 in FIG. 1 is arranged above the airframe 2. In addition, the main rotor 6 is provided with a plurality of blades 7.

A pilot can control the movement of the rotorcraft in conventional manner by varying the collective pitch and the cyclic pitch of the blades 7 by means of flight controls 58.

These flight controls may comprise a cyclic pitch control for the blades of the main rotor and a collective pitch control for the blades of the main rotor.

In addition, the rotorcraft is provided with a tail rotor 8 enabling the pilot to control movement of the rotorcraft in yaw. For example, pedals enable the pitch of blades 9 of the tail rotor 8 to be controlled.

Under such circumstances, the tail rotor is arranged on the tail 5 of the rotorcraft.

Furthermore, the rotorcraft 1 has at least one stabilizer device 10 arranged at the tail 5, each stabilizer device 10 being selected from a list comprising a tail plane 15 for stabilizing the rotorcraft 1 in pitching and a tail fin 20 for stabilizing the rotorcraft 1 in yaw.

In the example of FIG. 1, the rotorcraft 1 has a tail boom carrying a tail plane 15 and a tail fin 20, the tail rotor 8 being carried by the tail fin 20.

The tail plane shown has an airfoil member crossing the tail transversely. Nevertheless, other configurations could be envisaged. Thus, the tail plane could comprise a single airfoil member extending on one side only of the rotorcraft, or it could comprise a plurality of airfoil members each extending transversely on at least one side of the rotorcraft.

Furthermore, at least one stabilizer device 10 is a stabilizer device of variable wing area 11.

FIGS. 1 and 5 show a rotorcraft having a stabilizer device of variable wing area 11 of the tail-plane type. FIGS. 6 to 9 show a rotorcraft having a stabilizer device of variable wing area 11 of tail-fin type. FIGS. 10 and 11 show a rotorcraft having a stabilizer device of variable wing area 11 of tail-fin type and a stabilizer device of variable wing area 11 of tail-plane type.

Figure 2:
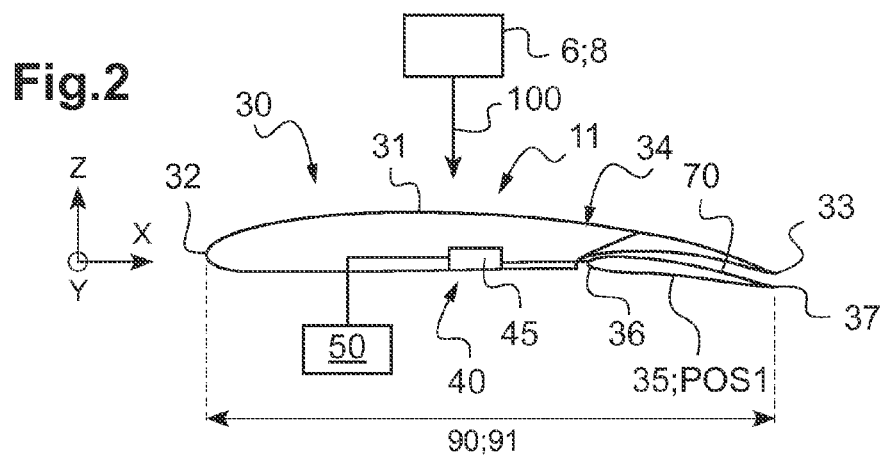
FIG. 2 is a diagrammatic view of an airfoil member having a movable airfoil surface in the refracted position.

Independently of the variant and with reference to FIG. 2, a variable wing area stabilizer device 11 comprises an airfoil member 30.

The airfoil member 30 is provided with an airfoil surface 31 secured to the rotorcraft airframe. Under such circumstances, this airfoil surface is said to be stationary airfoil surface 31.

In addition, the airfoil member 30 is provided with an airfoil surface 35 that is movable relative to the rotorcraft airframe and to the associated stationary airfoil surface 31, at least in translation. Under such circumstances, the airfoil surface is said to be movable airfoil surface 35.

Figure 3:
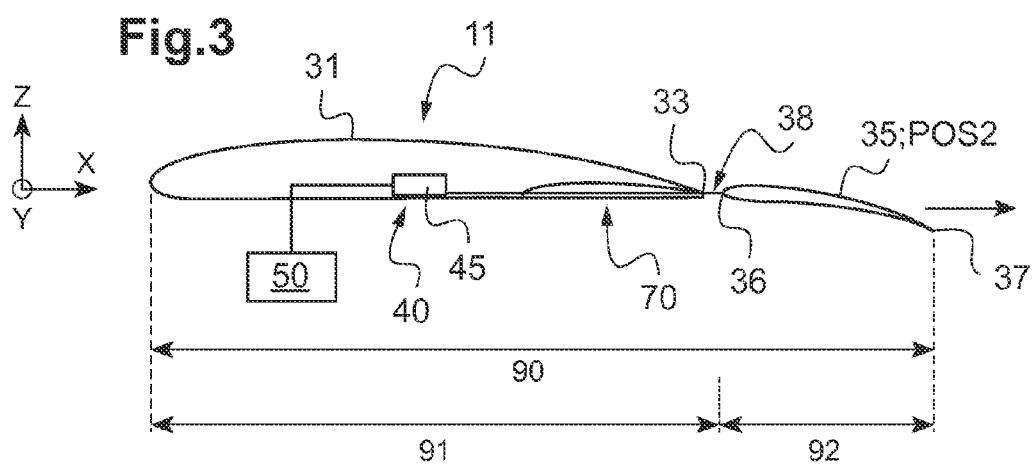
FIG. 3 is a diagrammatic view of an airfoil member having a movable airfoil surface in an extended position.

Thus, the movable airfoil surface may be moved in translation in particular between a refracted position POS1 as shown in FIG. 2 and an extended position POS2 as shown in FIG. 3.

The movable airfoil surface thus presents a flap of the airfoil member that is movable in translation and possibly, in an alternative, in rotation.

With reference to FIG. 2, the stationary airfoil surface 31 of an airfoil member then defines a housing 70 for receiving the movable airfoil surface 35 of said airfoil member 30 at least in part, when in the retracted position.

This housing 70 leads to the trailing edge 33 of the stationary airfoil surface 31.

For example, the housing is inscribed between the suction side surface and the pressure side surface of the stationary airfoil surface.

In the variant of FIG. 2, the housing 70 is defined in part by a single face of the stationary airfoil surface. In particular, the housing 70 is defined by the face of the stationary airfoil surface that is opposite from the face 34 that is struck by a stream of air 100 coming from a rotor 6, 8 of the rotorcraft.

The housing 70 is then masked from such a stream of air 100 when said rotorcraft 1 has a forward speed that is below a first speed threshold 110.

In the retracted position POST, the movable airfoil surface 35 is advantageously housed completely in the housing 70. The reference chord 90 of the airfoil member 30 is then equal to the reference chord 91 of the stationary airfoil surface 31.

With reference to FIG. 3, the movable airfoil surface 35 is shown in contrast extending the stationary airfoil surface 31 in the travel direction X of the rotorcraft 1 in its extended position POS2. A slot 38 may optionally separate the leading edge 36 of the movable airfoil surface from the trailing edge 33 of the stationary airfoil surface.

In order to give the movable airfoil surface 35 a degree of freedom to move in translation along a longitudinal direction X, the stabilizer device of variable wing area includes a mover system 40 for moving the movable airfoil surface 35 at least in translation relative to the stationary airfoil surface 31.

In the variant of FIG. 3, the mover system 40 may comprise a jack type actuator 45. The jack 45 may be an electric, hydraulic, or pneumatic jack.

In the variant of FIG. 1, the mover system 40 may comprise a wormscrew system type actuator. Such a wormscrew system is provided with a motor 41, such as an electric, hydraulic, or pneumatic motor, for example. In addition, the wormscrew system is provided with a wormscrew 42 and a nut 43 through which the wormscrew 42 passes.

Under such circumstances, the nut may be secured to a movable airfoil surface 35 so as to be provided with at least a degree of freedom to move in translation, eventually a single degree of freedom to move in translation.

Consequently, the motor drives the wormscrew 42 in rotation. The nut 43 then slides along the wormscrew, thereby causing the associated movable airfoil surface to move at least in translation.

Independently of the nature of the actuator of the mover system, the actuator is advantageously arranged at least in part in the tail boom 3.

In addition, the mover system may include at least one slideway 44 that guides the movement in translation of the movable airfoil surface.

In an alternative, the movable airfoil surface 35 is movable in translation only.

Nevertheless, in the alternative of FIG. 12, the movable airfoil surface 35 is movable both in translation and in rotation. For example, the movable airfoil surface 35 has studs 46 that slide in curved slideways 44. Under such circumstances, a movement in translation of the actuator 45 of the mover system leads to a movement both in rotation and in translation of the movable airfoil surface 35.

Furthermore, and with reference to FIG. 1, the stabilizer device of variable wing area includes a control system 50 connected to the mover system 40.

The control system 50 controls the mover system so as to position the movable airfoil surface 35 in the retracted position POST when the rotorcraft has a forward speed IAS less than a first speed threshold 110, and in an extended position when the rotorcraft 1 has a forward speed greater than a second speed threshold 120 that is greater than the first speed threshold 110.

This forward speed may be the indicated air speed (IAS) of the rotorcraft.

FIG. 4 shows a diagram presenting the forward speed of the aircraft plotted along the abscissa axis in knots (kt) and the travel of the movable airfoil surface 35 of an airfoil member plotted up the ordinate axis in millimeters.

Below the first speed threshold 110, the movable airfoil surface 35 is in the retracted position POS1. Above the second speed threshold 120, the movable airfoil surface 35 is in the extended position POS2.

Between the retracted position POS1 and the extended position POS2, the movement in translation of the movable airfoil surface 35 is determined, by way of example, by a relationship that is a function of the forward speed of the rotorcraft. Such a function may be an affine function.

With reference to FIG. 1, the control system 50 may include a computer 51 connected to the mover system 40.

Furthermore, the computer 51 is connected to a system 55 for measuring the forward speed of the rotorcraft 1 in order to determine the position in which the movable airfoil surface should be found.

Under such circumstances, the system 55 for measuring forward air speed may comprise an air speed measurement device 56 of conventional type serving to measure an indicated air speed IAS.

Optionally, the system 55 for measuring the forward speed comprises a measurement sensor 57 for measuring a position of at least one flight control 58 of the rotorcraft 1.

In the event of the air speed measurement device 56 malfunctioning, the computer may use the measurement sensor 57 for evaluating the forward speed of the rotorcraft. For example, the computer can estimate the forward speed as a function of the position of the device for controlling the cyclic pitch of the blades of the main rotor.

Optionally, the computer 51 may also include a degraded piloting relationship for telling the mover system 40 to place the movable airfoil surface 35 in the extended position POS2 in the event of the system 55 for measuring forward speed failing.

The control system 50 may also include at least one pilot-operable manual control means 60. The manual control means 60 are connected to the mover system 40 either directly or indirectly via the computer.

Under such circumstances, the actuator of a mover system can be controlled automatically or manually. For example, the mover system may be controlled automatically so long as the manual control means are not operated.

FIGS. 1 and 5 explain the operation of a rotorcraft including a variable wing area stabilizer device 11 of the tail-plane type.

With reference to FIG. 1, the tail plane 15 is provided with a stationary airfoil surface 31 and with a movable airfoil surface 35.

At low forward speed of the rotorcraft, i.e. when the rotorcraft is traveling at a forward speed less than the first speed threshold 110, the movable airfoil surface 35 is in the retracted position. The reference chord of the tail plane is then minimized, thereby tending to minimize the attitude hump phenomenon.

With reference to FIG. 5, when the rotorcraft is traveling at a forward speed greater than the first speed threshold 110, the movable airfoil surface 35 is moved away from the stationary airfoil surface longitudinally, either automatically or manually, so as to increase the reference chord of the tail plane.

When the rotorcraft is traveling at a forward speed greater than the second threshold speed 120, the movable airfoil surface 35 is in the extended position POS2, with the reference chord of the tail plane then being maximized.

FIGS. 6 to 9 show a rotorcraft having a variable wing surface stabilizer device 11 of the tail-fin type.

With reference to FIGS. 6 and 7, the tail fin 20 has a stationary airfoil surface 31 and a movable airfoil surface 35.

At a low forward speed of the rotorcraft, i.e. when the rotorcraft is traveling at a forward speed lower than the first speed threshold 110, the movable airfoil surface 35 is in the retracted position. The reference chord of the tail fin is then minimized, thereby tending to minimize the fin lock phenomenon.

With reference to FIGS. 8 and 9, when the rotorcraft is traveling at a forward speed greater than the first speed threshold 110, the movable airfoil surface 35 is moved away from the stationary airfoil surface in the longitudinal direction, either automatically or manually, in order to increase the reference chord of the tail fin.

When the rotorcraft is traveling at a forward speed greater than the second speed threshold 120, the movable airfoil surface 35 is in the extended position POS2, the reference chord of the tail fin then being maximized.

FIGS. 10 and 11 show a rotorcraft having a variable wing area stabilizer device 11 of the tail-fin type and a variable wing area stabilizer device 11 of the tail-plane type.

Optionally, the variable wing area stabilizer devices 11 have a common control system 50 and a common mover system 40.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A rotorcraft having an airframe extending longitudinally from a nose to a rear zone, the rotorcraft comprising at least one main lift rotor and at least one tail rotor for controlling yaw movement and arranged in the rear zone, the rotorcraft including at least one stabilizer device arranged in the rear zone, each stabilizer device being selected from a list comprising a tail plane for stabilizing the rotorcraft in pitching and a tail fin for stabilizing the rotorcraft in yaw, at least one of the stabilizer devices being a variable wing area stabilizer device, each variable wing area stabilizer device comprising an airfoil member having a stationary airfoil surface that is stationary relative to the airframe, the airfoil member having a movable airfoil surface that is movable relative to the stationary airfoil surface, wherein the movable airfoil surface is movable at least in translation relative to the stationary airfoil surface, the rotorcraft comprising:

a mover system for moving the movable airfoil surface at least in translation relative to the stationary airfoil surface from a retracted position in which a reference chord of the airfoil member is at a minimum, to an extended position in which the reference chord of the airfoil member is at a maximum; and a control system connected to the mover system to position the movable airfoil surface in the retracted position when the rotorcraft has a forward speed less than a first speed threshold, and in an extended position when the rotorcraft has a forward speed greater than a second speed threshold greater than the first speed threshold.

2. A rotorcraft according to claim 1, wherein at least two stabilizer devices are variable wing area stabilizer devices, the variable wing area stabilizer devices having a control system in common.

3. A rotorcraft according to claim 1, wherein at least two stabilizer devices are variable wing area stabilizer devices, the variable wing area stabilizer devices having a mover system in common.

4. A rotorcraft according to claim 1, wherein the mover system is a wormscrew system provided with a motor, a wormscrew, and at least one nut engaged on the wormscrew.

5. A rotorcraft according to claim 4, wherein the wormscrew is driven in rotation by the motor, the nut being fastened to a movable airfoil surface and being prevented from moving in rotation relative to the movable airfoil surface.

6. A rotorcraft according to claim 1, wherein the mover system comprises a jack.

7. A rotorcraft according to claim 1, wherein the airframe includes a tail boom carrying the variable wing area stabilizer device, and the mover system is arranged at least in part in the tail boom.

8. A rotorcraft according to claim 1, wherein the control system includes a computer, the computer being connected to a system for measuring the forward speed of the rotorcraft and to the mover system.

9. A rotorcraft according to claim 8, wherein the computer includes a relationship for degrading control of the mover system so as to position the movable airfoil surface in the extended position in the event of the system for measuring forward air speed malfunctioning.

10. A rotorcraft according to claim 8, wherein the system for measuring the forward air speed comprises an air speed measurement device enabling an indicated air speed to be measured.

11. A rotorcraft according to claim 8, wherein the system for measuring forward speed comprises a measurement sensor for measuring a position of at least one flight control of the rotorcraft.

12. A rotorcraft according to claim 1, wherein the control system includes manual control means operable by a pilot, the manual control means being connected to the mover system.

13. A rotorcraft according to claim 1, wherein the stationary airfoil surface includes a housing opening out to a trailing edge of the stationary airfoil surface, the movable airfoil surface being housed at least in part in the housing when in the refracted position.

14. A rotorcraft according to claim 13, wherein the movable airfoil surface is housed at least in part in the housing in the retracted position, with the reference chord of the airfoil member being equal to the reference chord of the stationary airfoil surface when the movable airfoil surface is in the retracted position.

15. A rotorcraft according to claim 1, wherein the movable airfoil surface, when in the extended position, lies in continuity with the stationary airfoil surface in the forward direction of the rotorcraft.

16. A rotorcraft according to claim 13, wherein, when the rotorcraft has a forward speed less than the first speed threshold, an air stream coming from a rotor impacts against a face of the stationary airfoil surface, and the housing is masked by the face facing the air stream.

17. A rotorcraft according to claim 1, wherein the movable airfoil surface is movable both in rotation and in translation relative to the stationary airfoil surface, the mover system moving the movable airfoil surface both in rotation and in translation relative to the stationary airfoil surface from a retracted position in which a reference chord of the airfoil member is at a minimum to an extended position in which the reference chord of the airfoil member is at a maximum.

18. A rotorcraft according to claim 1, wherein the movable airfoil surface is movable in translation relative to the stationary airfoil surface, the mover system moving the movable airfoil surface in translation relative to the stationary airfoil surface from a retracted position in which a reference chord of the airfoil member is at a minimum to an extended position in which the reference chord of the airfoil member is at a maximum.

\* \* \* \* \*